(12) United States Patent
Kim et al.

(10) Patent No.: US 8,815,994 B2
(45) Date of Patent: Aug. 26, 2014

(54) HEAT-SHRINKABLE POLYESTER-BASED SINGLE-LAYER FILM

(75) Inventors: Yun Jo Kim, Gumi-si (KR); Dong Jin Kim, Gumi-si (KR); Si Min Kim, Dalseo-gu (KR)

(73) Assignee: Kolon Industries, Inc., Gwacheon-Si (KR)

( * ) Notice: Subject to any disclaimer, the term of this patent is extended or adjusted under 35 U.S.C. 154(b) by 0 days.

(21) Appl. No.: 13/636,190

(22) PCT Filed: Mar. 31, 2011

(86) PCT No.: PCT/KR2011/002234
§ 371 (c)(1),
(2), (4) Date: Sep. 20, 2012

(87) PCT Pub. No.: WO2011/122880
PCT Pub. Date: Oct. 6, 2011

(65) Prior Publication Data
US 2013/0012640 A1     Jan. 10, 2013

(30) Foreign Application Priority Data
Mar. 31, 2010 (KR) .................. 10-2010-0029599

(51) Int. Cl.
C08J 5/18 (2006.01)
C08L 67/02 (2006.01)
C08K 3/22 (2006.01)
B29C 55/08 (2006.01)

(52) U.S. Cl.
USPC ............... 524/431; 528/308.6; 528/308.7

(58) Field of Classification Search
USPC ................ 524/431; 528/308.6, 308.7
IPC ........................................... C08J 5/18
See application file for complete search history.

(56) References Cited

U.S. PATENT DOCUMENTS

| 4,939,232 A * | 7/1990 | Fukuda et al. ............ 528/272 |
| 4,996,291 A * | 2/1991 | Yoshinaka et al. ......... 528/272 |
| 5,985,387 A * | 11/1999 | Mori et al. ............... 428/34.9 |
| 2003/0165671 A1* | 9/2003 | Hashimoto et al. ...... 428/304.4 |
| 2007/0248777 A1* | 10/2007 | Lee et al. ................. 428/34.1 |
| 2010/0247845 A1 | 9/2010 | Haruta et al. |

FOREIGN PATENT DOCUMENTS

| EP | 2 058 357 A1 | 5/2009 |
| JP | 06-015732 A | 1/1994 |
| JP | 09-239833 A | 9/1997 |
| JP | 2004-175067 A | 6/2004 |
| WO | 2009/041408 A1 | 4/2009 |

OTHER PUBLICATIONS

International Searching Authority, International Search Report of PCT/KR2011/002234 dated Dec. 21, 2011.

* cited by examiner

*Primary Examiner* — Brieann R Fink
(74) *Attorney, Agent, or Firm* — Sughrue Mion, PLLC

(57) ABSTRACT

The present invention relates to a heat-shrinkable polyester-based single-layer film which has superior shrinkability and color, and thus provides aesthetic enhancement to the product to which the film is attached when the film is printed. Therefore, the polyester-based single-layer film of the present invention can be valuably used as a label film as it can replace labels made of paper, and can be easily peeled off by means of hot water, thus contributing to the recycling of bottles.

7 Claims, No Drawings

HEAT-SHRINKABLE POLYESTER-BASED SINGLE-LAYER FILM

TECHNICAL FIELD

The present invention relates to a polyester-based single-layer film having heat shrinkability.

BACKGROUND ART

Taking into consideration environmental requirements and profitability, PET bottles or glass bottles have been collected and recycled. Upon recycling, labels having printed product names, components and other figures excluding the bodies of PET bottles or glass bottles have to be separated and removed from the bottles. In particular, the paper labels that have mainly been used to date are removed using industrial water. Specifically, the collected PET bottles or glass bottles are immersed in industrial water at about 80° C. containing caustic soda to remove the labels therefrom. Thereby, recycling of the bottles generates environmental wastewater, which is subject to environmental regulations.

Therefore, the demand for film labels, not paper labels, is increasing.

An example of a film usable as a label includes a polyvinyl chloride-based film, which undesirably causes environmental problems such as the generation of dioxin upon incineration, etc. Accordingly, a heat-shrinkable polyester-based film is receiving attention as a replacement for the paper labels.

A heat-shrinkable polyester-based film may be utilized as a label by printing the film in the form of a sticker or as in a conventional paper label and attaching the film using an aqueous adhesive.

Compared to typical PET bottles or drink bottles, PET bottles or glass bottles used for liquor purposes mainly get their color from a pigment, a UV block, and other additives that are mixed in to minimize the denaturation of the contents of the bottle.

In order to make the advertisement effects that are shown using a film label on such bottles more obvious, the back surface of the printed film label may be subjected to back coating using white ink or the like. In this case, however, coating effects are small and the color of the bottle is projected as is, undesirably decreasing advertisement effects. As such, two or more back coatings are required, which undesirably decreases processability and productivity.

Also when a label is adhered using an adhesive, an adhesive is applied onto a bottle using gravure printing or the like, and thus a mark formed by applying the adhesive is present in the form of a band. Although the paper label may hide such an adhesive mark, the heat-shrinkable film has low hiding capacity and thus such a mark is projected as is, undesirably decreasing advertisement effects.

DISCLOSURE

Technical Problem

Accordingly, the present invention is intended to provide a heat-shrinkable polyester-based single-layer film, which retains shrinkability and is colored and thus may exhibit a good print appearance and high hiding capacity when used as a label.

Technical Solution

An embodiment of the present invention provides a heat-shrinkable polyester-based single-layer film, comprising a polyester-based resin matrix including a repeating unit of 2,2-dimethyl(-1,3-propane)diol copolyester and particles dispersed in the resin matrix, wherein the film has a haze of 80~95%, a haze deviation of within ±5% of an average haze over the entire width of a film roll, a shrinkage of 40~80% in a maximum shrinking direction upon treatment with warm water at 90° C. for 10 sec, and a shrinkage deviation of within ±5% of an average shrinkage in the maximum shrinking direction.

In this embodiment, the particles may have an average particle size of 0.1~5 μm.

In this embodiment, the particles may be titanium oxide, and may be included in an amount of 2~10 wt % based on a total weight of the film.

Another embodiment of the present invention provides a method of manufacturing a heat-shrinkable polyester-based single-layer film by extruding and stretching a polyester-based resin, comprising compounding particles having an average particle size of 0.1~5 μm and a 2,2-dimethyl(-1,3-propane)diol copolyester resin having an intrinsic viscosity of at least 0.6 dl/g, thus manufacturing a polyester-based resin master batch containing particles, wherein the particles are included in an amount of 10~70 wt % based on a total weight of the master batch; mixing and extruding the polyester-based resin master batch containing particles and a 2,2-dimethyl(-1,3-propane)diol copolyester resin thus manufacturing an unstretched polyester-based sheet, wherein the particles are included in an amount of 2~10 wt % based on a total weight of the film; preheating the extruded polyester-based sheet; and stretching the sheet in a transverse direction at 65~100° C.

In this embodiment, manufacturing the master batch may comprise mixing the 2,2-dimethyl(-1,3-propane)diol copolyester and the particles to create a mixture; placing the mixture in a twin-screw extruder or a kneader so that the mixture is melted and mixed thus obtaining polyester-based master batch chips containing particles; rubbing the master batch chips with each other to form minute roughness on at least a portion of a surface thereof; and drying the master batch chips having minute roughness on at least the portion of the surface thereof.

In this embodiment, mixing the master batch and the 2,2-dimethyl(-1,3-propane)diol copolyester resin may comprise providing a separation means in a feeding section for feeding the master batch and the resin into an extruder, so that the 2,2-dimethyl(-1,3-propane)diol copolyester resin is fed into one portion of the feeding section divided by the separation means, and the master batch chips are fed into the other portion of the feeding section using a quantitative feeding section, thus melting and mixing the master batch and the 2,2-dimethyl(-1,3-propane)diol copolyester resin at a feeding section of the extruder via rotation of a screw of the extruder.

In this embodiment, stretching in the transverse direction may be performed at a stretching ratio of 3.5~5.0 times.

In this embodiment, the particles of the polyester-based resin master batch may be titanium oxide.

Advantageous Effects

According to an embodiment of the present invention, a heat-shrinkable polyester-based film retains heat shrinkability which is intrinsic to the shrinkable film, and is colored and thus can exhibit a good print appearance and high hiding capacity when used as a label. Also upon recycling of a bottle having such a film as a label, the label can be removed using only hot water to thereby prevent the generation of wastewater and is thus eco-friendly.

Best Mode

An embodiment of the present invention provides a heat-shrinkable polyester-based single-layer film, which includes a polyester-based resin matrix having a repeating unit of 2,2-dimethyl(-1,3-propane)diol copolyester and particles dispersed therein, wherein the film has a haze (%) of 80~95%, a haze deviation of within ±5% of the average over the entire width of a film roll, and a shrinkage of 40~80% in a maximum shrinking direction upon treatment with warm water at 90° C. for 10 sec.

Also in the polyester-based film according to an embodiment of the invention, the polyester-based resin matrix includes a repeating unit of 2,2-dimethyl(-1,3-propane)diol copolyester.

As such, the repeating unit of 2,2-dimethyl(-1,3-propane) diol copolyester may be obtained by copolymerizing terephthalic acid or dimethylterephthalate as a dicarboxylic acid component and ethyleneglycol and 2,2-dimethyl(1,3-propane)diol as diol components upon polymerization of a polyester resin.

The copolyester may be prepared using a typical polyester preparation method. Examples of such a preparation method include direct esterification in which a dicarboxylic acid is directly reacted with a diol, transesterification between a dimethyl ester of dicarboxylic acid and a diol, etc.

According to an embodiment of the present invention, the copolyester has a glass transition temperature of 67~80° C. and an intrinsic viscosity of 0.60~0.70 dl/g. The glass transition temperature may be adjusted depending on the composition of the monomer used to prepare the polymer, and the intrinsic viscosity may be adjusted depending on the degree of polymerization. In the present invention, a copolyester having a glass transition temperature and an intrinsic viscosity adjusted to the above ranges may be used.

The heat-shrinkable polyester-based film according to an embodiment of the present invention has a haze of 80~95%. When this film is used as a label for a PET bottle and a glass bottle, which exhibit color, its haze should be at least 80%, and preferably 90% or more in order to ensure hiding capacity adapted to offset the inherent color of the bottle. However, if the haze exceeds 95%, the particles are added in an excessively large amount, undesirably decreasing the shrinkage, and furthermore, a large amount of protrusions may be generated due to aggregation of the particles on the surface of the film, undesirably deteriorating the printing process.

The haze (%) was measured according to ASTM D-1003. Concretely, seven parts were randomly extracted from two peripheral positions and one central position of a polyester film, cut to a size of 5 cm×5 cm, placed in a haze meter (NDH 300A, Nippon Denshoku), and then irradiated with light having a wavelength of 555 nm to measure their respective haze values (%). The average of five values excluding the maximum and minimum values was determined and defined as the haze.

While satisfying the above haze (%), the film has to have a haze deviation of within ±5% of the average over the entire width of a film roll. The low haze deviation of the film over the entire width of a film roll implies that particles are uniformly dispersed in the film.

In the present invention, the meaning of "the haze deviation of a film over the entire width of a film roll is within ±5% of the average" will be understood as follows: film samples having a size of 5 cm×5 cm are cut from contiguous sections of a film over the entire width of the film, and their respective haze values are measured in the same manner as in the above method of measuring the haze based on ASTM D-1003, so that the average, the maximum value and the minimum value of all of the samples are determined and the maximum value and the minimum value fall within ±5% of the average over the entire width of the film roll.

The polyester-based film is intrinsically transparent. In order to make such a polyester-based film opaque, inorganic particles or inert organic particles may be used. An example of the addition of particles includes adding particles during a polymerization process to obtain a polymer containing a high concentration of the particles. In this case, however, it is difficult to increase the amount of particles in the polymer so that they are present in at least the predetermined amount due to problems with dispersing the particles while carrying out the polymerization. Briefly it is difficult to exhibit the above haze, and also upon forming a film, a uniform haze cannot be obtained over the entire width of a film roll because of the non-uniform dispersion.

Accordingly in an embodiment of the present invention, particles are separately mixed with a polymerized polymer, and also, the particles are provided in the form of a master batch so that the amount of the particles that are included is maximized. Furthermore, the preparation process used to prepare the master batch of particles may be controlled so as to exert the utmost control over the particle size, the selection of the kind of particles, the selection of the binder resin, the dispersion uniformity of particles and uniformity of the amount of particles in the master batch chips. Controlling the above can minimize the haze deviation over the entire width of a film roll.

For example, in the heat-shrinkable polyester-based single-layer film according to an embodiment of the present invention, the size of the particles may be 0.1~5 μm on average. When the average particle size of the particles falls within the above range, it is easy to control the optical characteristics and the shrinkage.

Examples of the inorganic particles which are added so that the film exhibits a color include barium sulfate, titanium oxide and silica. Preferably useful is titanium oxide in terms of good stretchability and inducing scattering of the light which takes place because of the particles. In the case of barium sulfate, micro-voids may be formed in the film during a stretching process to cause diffused reflection of light so that the film is imparted with color. However, there may occur cases where the colored film becomes transparent because the micro-voids formed in the film may disappear due to the close contact of polymer chains while shrinking the film, and thus the variety of applications in which barium sulfate can be used are limited. Also in the case of silica, the size of the particles is limited, and upon forming a film having a large amount of particles using particles having a large particle size, the large amount of the big particles may protrude from the surface of the film, undesirably deteriorating the print appearance.

Consequently, titanium oxide particles are particles which have an optimal ability to exhibit color while maintaining shrinkability.

Also, the amount of the particles should be controlled so as to satisfy the shrinkage of the film while showing a color depending on the type of particles. The amount of titanium oxide is set to 2~10 wt % based on the total weight of the film in order to satisfy the shrinkage while ensuring the above haze.

The heat-shrinkable polyester-based single-layer film according to an embodiment of the present invention has a shrinkage of 40~80% in a maximum shrinking direction upon treatment with warm water at 90° C. for 10 sec.

Typically in order to shrink a vessel or the like coated with a heat-shrinkable film label, etc., the vessel is passed through a hot air tunnel at about 120~200° C. for about 2~20 sec using hot air at a flow rate of about 2~20 m/sec, or is passed through a steam tunnel at about 75~95° C. and a pressure of about 0.5~20 MPa for about 2~20 sec.

Hence, when the shrinkage, in particular, the hot water shrinkage, of the film according to an embodiment of the invention falls within the above range, very good shrink appearance may be obtained under typical shrinking conditions.

If the shrinkage of the film in the main shrinking direction upon treatment with warm water at 90° C. for 10 sec is less than 40%, the period of time required to perform a shrinking process may become longer, undesirably lowering productivity, increasing energy costs and decreasing applications adapted for the structure of a vessel, thus making it difficult to apply the film to vessels having a variety of shapes. In contrast, if the shrinkage of the film in the main shrinking direction is more than 80%, it is difficult to allow the air present between the vessel and the label to escape because of the excessively high shrink speed, undesirably forming an air layer between the label and the vessel thus deteriorating the outer appearance of a product.

When the hot water shrinkage range of the heat-shrinkable film is the same as that given above, in order to recycle a bottle or the like that has the heat-shrinkable film label attached thereto by an adhesive, it becomes easy to peel off the label using hot water, and also the film which was peeled off in a state of being rolled in the bottle may be easily taken out of the bottle.

The film which satisfies the above conditions may show a shrinkage deviation of within ±5% of the average in a maximum shrinking direction over the entire width of a film roll. The uniform shrinkage over the entire width of a film roll may result from uniformly dispersing particles which are added to exhibit a color.

In the present invention, the meaning of "a shrinkage deviation of a film in a maximum shrinking direction over the entire width of a film roll is within ±5% of the average" will be understood as follows: ten film samples having a size of 15 mm (MD)×400 mm (TD) are cut from contiguous sections of a film, and a straight line is drawn in the MD of the film from positions spaced apart by 50 mm from both ends of respective samples in TD to manufacture measurement samples having an effective length of 300 mm required to measure a shrinkage, after which the shrinkage is measured in the maximum shrinking direction under no load in warm water at 90±0.5° C., thus determining the average, the maximum value and the minimum value of all of the measurement samples, and the maximum and minimum values of the shrinkage in the main shrinking direction fall within ±5% of the average.

If the length of a film sample in TD is less than 400 mm, the shrinkage is measured in the same manner as above, so long as the size is sufficiently large that the size of the measurement samples or the effective length required to measure the shrinkage is able to vary.

Meanwhile, the heat-shrinkable film according to an embodiment of the invention may include an inline coating layer having an antistatic agent on the surface thereof.

As used herein, the term "inline coating layer" will be understood as a layer formed by performing a coating process during extruding a polyester resin to form a film by those having ordinary knowledge in the art.

The case where the inline coating layer having an antistatic agent is formed on the surface of the film in this way is favorable because static electricity caused by friction may be decreased thus preventing portions of the film from clinging to each other during the course of winding the film, thereby facilitating the removal of air introduced during the winding of the film. Also, in a printing process, poor printing due to static electricity caused by friction between the printing roll and the film may be prevented, and portions of the film may be prevented from clinging due to static electricity upon post-processing, thus controlling poor feeding.

The antistatic agent is not particularly limited but examples thereof include quaternary ammonium compounds, alkyl sulfonate compounds represented by $RSO_3Na$, alkyl sulfate compounds represented by $ROSO_3Na$, alkyl phosphate compounds, etc. The antistatic agent is used in an amount of 0.1~1.5 wt % based on the effective components of the coating solution for forming the inline coating layer in order to minimize the generation of impurities due to friction in printing, tubing and heat shrinking processes to thereby attain superior processability and antistatic performance.

Also, the inline coating layer may include a binder resin taking into consideration the binding force and the adhesive force. The binder resin is not particularly limited and may be selected in consideration of its solubility in a solvent used in a tubing process.

Examples of the binder resin include polyesters, acryl-polyester copolymers, copolyesters, etc.

The heat-shrinkable polyester film layer having the above characteristics may be prepared by going through the following procedure.

First, a master batch of particles is manufactured.

As such, the master batch of particles is preferably manufactured using 2,2-dimethyl(-1,3-propane)diol copolyester which is the same as the resin of the matrix of the film and the titanium oxide particles as mentioned above in order to ensure compatibility.

When the master batch of particles is manufactured using 2,2-dimethyl(-1,3-propane)diol copolyester which is the polymer used to form a film, it is not easy to actually dry master batch chips due to non-crystallinity of the resin.

Thus, the master batch of particles is manufactured according to the following procedure in an embodiment of the invention.

Manufacturing the master batch of particles includes mixing 2,2-dimethyl(-1,3-propane)diol copolyester with particles to create a mixture; placing the mixture in a twin-screw extruder or a kneader so that the mixture is melted and mixed thus obtaining polyester-based master batch chips containing particles; rubbing the master batch chips with each other to form minute roughness on at least a portion of the surface thereof; and drying the master batch chips having minute roughness on at least the portion of the surface thereof.

If the minute roughness are not formed on at least a portion of the surface of the manufactured master batch chips containing particles, surface fusion of the master batch chips may occur due to heat that exists upon subsequent crystallization of the manufactured chips, undesirably causing lumping of the chips, making it difficult to deliver the crystallized master batch chips to a drying process. Also, when the lumped master batch chips are delivered to a drying process, they are in a state of not having been completely dewatered, and thus it becomes difficult to perform the film forming process because of splitting or the like.

Surface rubbing of the master batch chips is not particularly limited, but such chips are typically placed in a screw feeder type surface treatment machine so that irregularities may be formed on the surface of the chips by rubbing the chips together, and rubbing that takes place between the chips and the screw and the barrel. In this case, the surface of the chips may be partially crystallized by the heat.

When the irregularities are formed by the surface rubbing that occurs in this way, the contact area between the chips may be decreased in the subsequent crystallization process which is carried out at high temperature, thus controlling the generation of lumping due to the fusion of the surfaces of the chips.

The particles have an average particle size of 0.1~5 μm as mentioned above, and the 2,2-dimethyl(-1,3-propane)diol copolyester resin preferably has an intrinsic viscosity of at least 0.6 dl/g in consideration of it being made difficult to control the thickness due to low die discharge pressure in the film forming process because of a reduction in the viscosity due to the heat that occurs during the manufacturing of the master batch using a twin-screw extruder or the like.

The amount of the particles of the master batch may be 10~70 wt %, and the maximum amount of the particles of the master batch may be determined in consideration of the dispersion uniformity of particles in the master batch, and processability thereof.

When the polyester-based resin master batch containing particles and the 2,2-dimethyl(-1,3-propane)diol copolyester resin are mixed and extruded to manufacture a polyester-based sheet, the amount of the master batch may be adjusted so that the particles are included in an amount of 2~10 wt % based on the total weight of the film.

Because the polyester-based resin master batch chips containing particles have higher specific gravity than that of the 2,2-dimethyl(-1,3-propane)diol copolyester resin, the use of typical blending decreases dispersibility, consequently deteriorating optical characteristics and shrinkability of the film.

Thus in the present invention, in order to ensure the uniform dispersibility of the particles in the film, when the master batch chips and the 2,2-dimethyl(-1,3-propane)diol copolyester resin are fed into an extruder, a separation means such as a separator or the like is provided in a hopper, so that the 2,2-dimethyl(-1,3-propane)diol copolyester resin is fed into one portion of the hopper divided by the separator, and the master batch chips are fed into the other portion of the hopper using a quantitative feeder, for example, a side feeder, whereby the resin and the master batch chips are not actually mixed in the hopper but are melted and mixed at the feeding part of the extruder by means of the rotation of the screw. As such, the position of the quantitative feeder for feeding the master batch is set in reference to the separation means in the hopper so that the master batch chips are supplied into a starting position of the extruder in the running direction of the extruder, thereby facilitating the mixing of the master batch chips and the resin via the rotation of the screw and improving the dispersibility of the particles while controlling the amount of the particles in the film.

The amount of the particles in the film may be adjusted by controlling the rotational frequency (rpm) of the quantitative feeder for supplying the master batch chips relative to the total amount of discharged polymer depending on the rotational frequency of the extruder so as to adjust the miscibility of 2,2-dimethyl(-1,3-propane)diol copolyester resin and master batch chips.

Meanwhile, extrusion is carried out at 200~350° C. To this end, any known process such as T-die extrusion or tubular extrusion may be used.

The extruded product is uniformly attached to a cooling roll using an electrostatic charge contact process or the like and is thus rapidly cooled, thereby obtaining an unstretched film.

The unstretched film is passed through rollers which run naturally in MD, followed by performing pretreatment, TD stretching and then heat treatment.

As such, because the haze of the film may vary depending on the stretching conditions even when the amount of particles that are used is the same, the stretching conditions have to be controlled. The heat treatment conditions must also be controlled for the same reason. That is, the haze may vary depending on the stretching conditions. As the stretching temperature drops, the haze increases given that the amount of particles remains constant. In this case, however, workability may decrease due to splitting, and thus it is preferred that the stretching temperature be set to 65~100° C., and that the stretching ratio be set to 3.5~5.0 times.

If the stretching ratio of the shrinkable film is low, the shrinkage of the film may decrease. In contrast, if the stretching ratio is too high, splitting may occur or it is difficult to improve other properties, and so increasing the stretching ratio above a certain amount has no positive benefit. Hence, the stretching ratio may be set in the range of about 3.5~5.0 times the original length of the film.

The stretching may be conducted using a typical device, and any known process such as roll stretching, tenter stretching, tubular stretching, etc. may be employed.

After the stretching process, heat treatment is conducted in a temperature range from room temperature to 100° C.

In order to form the inline coating layer as above, before pretreating the extruded polyester sheet, a coating of a coating solution including an antistatic agent may be applied, and the subsequent processes may be performed.

Mode for Invention

Infra, examples are given so that an understanding of the present invention will be more fully conveyed. However, the scope of the invention is not limited to these examples.

The evaluation methods used in the present invention are as follows.

(1) Intrinsic Viscosity (I.V.) of Film

IV was measured using a viscosity meter at a concentration of 0.3 g per 25 ml of ortho-chlorophenol at 35° C.

(2) Glass Transition Temperature (Tg) of Polyester

A test sample was heated at a rate of 20° C./min and the Tg thereof was measured using DSC-7 available from The Perkin-Elmer Corp.

(3) Heat Shrinkage

A film was cut into a rectangular shape having a size of 15 mm (MD)×400 mm (TD), and a straight line was drawn in MD of the film from positions spaced apart by 50 mm from both ends of the film in TD thus manufacturing a sample having an effective measurement length of 300 mm. While being held by a pincette or the like at a position within 50 mm from one end of the sample regardless of right and left, the sample was completely immersed in warm water at 90° C.±0.5° C. under no load so that it was thermally shrunk for 10 sec, after which the sample was allowed to stand at room temperature for 1 min. The length by which the initial 300 mm had decreased as represented by the straight line in TD was measured, and the heat shrinkage of the film in TD was determined by the following Equation 1.

$$\text{Heat Shrinkage (\%)} = \frac{300 \text{ mm} - \text{Length after Shrinking}}{300 \text{ mm}} \times 100 \qquad \langle\text{Equation 1}\rangle$$

(4) Shrinkage Deviation

Ten film samples having a size of 15 mm (MD)×400 mm (TD) were cut from contiguous sections of a film, and a straight line was drawn in MD from positions spaced apart by 50 mm from both ends of respective film samples in TD to manufacture measurement samples having an effective measurement length of 300 mm. While being held by a pincette or the like at a position within 50 mm from one end of each of the samples regardless of right and left, the samples were completely immersed in warm water at 90±0.5° C. under no load so that they were thermally shrunk for 10 sec, after which the samples were allowed to stand at room temperature for 1 min. The length by which the initial 300 mm had decreased as represented by the straight line in TD was measured, thus determining the shrinkage of the film in a maximum shrinking direction. The average, the maximum value and the minimum value of all of the samples were determined, and the absolute value was taken of the difference between the average and the maximum value or the minimum value. Among these values, the larger value was defined as the shrinkage deviation as determined by the following Equation 2.

Shrinkage Deviation=|Average Shrinkage Value−Maximum Shrinkage Value (or Minimum Shrinkage Value)|  <Equation 2>

(5) Haze

The haze of the film was measured according to ASTM D-1003. Specifically, seven parts were randomly extracted from two peripheral positions and one central position of a polyester film, cut to a size of 5 cm×5 cm, placed in a haze meter (NDH 300A, Nippon Denshoku), and irradiated with light having a wavelength of 555 nm to measure their respective haze values (%), and the average of five values excluding the maximum value and the minimum value was determined to calculate the haze.

(6) Haze Deviation

Samples having a size of 5 cm×5 cm were cut from contiguous sections of a film over the entire width of the film, and their haze values were measured in the same manner as in the above measurement of haze using ASTM D-1003, thus determining the average, the maximum value and the minimum value of all of the samples, after which the absolute value was taken of the difference between the average and the maximum value or the minimum value. Among these values, the larger value was defined as the haze deviation as determined by the following Equation 3.

Haze Deviation=|Average Haze Value−Maximum Haze Value (or Minimum Haze Value)|  <Equation 3>

(7) Evaluation of Print Appearance

A film roll having a width of 560 mm and a length of 2000 m was printed to measure the number of protrusions generated upon printing in order to evaluate printing uniformity.

Using a typical gravure printing machine, 6-color printing using red, blue, yellow, green, black and white was carried out. Poor printing due to protrusions was judged based on circular and oval printing dots formed by the non-uniform application of ink, and thus a printing defect was determined based on the number of protrusions generated over 2000 m according to the following Equation 4.

Printing Defect (%)=[Number of generated Protrusions (ea)/2000 (m)]×100  <Equation 4>

(8) Evaluation of Peeling of Printed Label

An aqueous adhesive prepared by mixing 45 parts by weight of styrene-butadiene rubber latex, 40 parts by weight of an acrylic emulsion, 10 parts by weight of an ethylene-vinyl emulsion, 0.8 parts by weight of sodium hydroxide, 0.1 parts by weight of a disinfecting agent, and 4.1 parts by weight of water was applied to a thickness of 5 μm on a printed label. The film having the adhesive applied thereon was attached to a glass bottle, reciprocally rubbed ten times using a rubber roller under a pressure of 3 kg/cm² over the entire area of the film so that the film was firmly attached to the glass bottle, and then allowed to sit at room temperature for 2 days to solidify the adhesive, thereby securely fixing the film to the glass bottle.

1000 glass bottles having films attached thereto were allowed to stand in warm water at 80° C. for 2 min, and the bottles from which the film did not completely peel off were counted, and the degree of peeling was evaluated by a peeling defect according to the following Equation 5.

$$\text{Peeling Defect (\%)} = \frac{\text{Number of Bottles from which film did not completely peel off}(ea)}{1000 \ (ea)} \times 100 \qquad \langle\text{Equation 5}\rangle$$

EXAMPLE 1

(1) 100 mol % of terephthalic acid as a dibasic acid component, 100 mol % of ethyleneglycol and 24 mol % of 2,2-dimethyl(-1,3-propane)diol as glycol components, and 0.05 mol antimony trioxide (for the acid component) as a catalyst were polycondensed through direct esterification, thus preparing 2,2-dimethyl(-1,3-propane)diol copolyester having an intrinsic viscosity of 0.67 dl/g and a glass transition temperature of 76° C.

(2) A mixture of 2,2-dimethyl(-1,3-propane)diol copolyester and titanium oxide particles (particle size: 0.5 μm) was placed in a twin-screw extruder or a kneader and then melted and mixed, thus obtaining polyester-based master batch chips containing particles. The master batch chips containing particles were then subjected to anti-sticking treatment in such a manner that minute roughness were formed on at least a portion of the surface of the chips via rubbing between the chips and rubbing between the chips and the screw and the barrel using a milling machine equipped with a screw. As such, milling was performed under conditions of room temperature, 1750 rpm, 45 A, and a rate of 2 ton/hr.

The obtained master batch chips were pre-crystallized at 130° C., and dried at 160° C. to dewater them. As such, the amount of titanium oxide in the master batch chips was 50 wt %.

(3) When the (1) 2,2-dimethyl(-1,3-propane)diol copolyester and the (2) master batch were fed into the extruder, to prevent miscibility of the chips from decreasing due to the difference in specific gravity therebetween, a separator was provided in a hopper, and a quantitative feeder (e.g. a side feeder able to control the amount of added chips by adjusting the rotational frequency) for feeding master batch chips was provided on a side of the hopper located at a starting position of the extruder in the running direction of the extruder with respect to the separator.

The 2,2-dimethyl(-1,3-propane)diol copolyester was fed into one portion of the hopper divided by the separator, and the master batch chips containing particles were fed into the other portion of the hopper using a side feeder at a predetermined rotational frequency, so that the 2,2-dimethyl(-1,3-propane)diol copolyester and the master batch chips containing particles were mixed and extruded by means of the screw of the extruder via the rotation of the extruder, thereby solving mixing problems that occurred because of the size of chips and the difference in specific gravity. The master batch chips were fed in an amount of 20 wt % based on the total weight of the polymer.

The 2,2-dimethyl(-1,3-propane)diol copolyester resin and the master batch chips were melted, mixed and extruded using an extruder at 280° C., and then rapidly cooled using a cooling roller, thus obtaining a solidified unstretched film.

The unstretched film was passed through a roller moving in MD, subjected to inline coating (ILC), preheated at 85° C., stretched 4.2 times in TD at 70° C., and then heat treated at room temperature, thus manufacturing a film.

As such, ILC was conducted by applying a coating solution containing 0.4 wt % of an acryl-polyester copolymer binder and 0.1 wt % of an alkyl phosphate-based antistatic agent based on effective components thereof using Mayer Bar #4.

The obtained film was a heat-shrinkable film having a thickness of 50 μm. The properties of the film are shown in Table 3 below.

EXAMPLES 2~10

Heat-shrinkable films were manufactured in the same manner as in Example 1, with the exception that mol % of 2,2-dimethyl(-1,3-propane)diol in the 2,2-dimethyl(-1,3-propane)diol copolyester, the size of particles used in the master batch chips, the amount of particles in the film, the TD stretching temperature and the heat treatment temperature were changed as shown in Table 1 below. The properties of the films are shown in Table 3 below.

REFERENCE EXAMPLES 1 TO 4

Heat-shrinkable films were manufactured in the same manner as in Examples 1 to 4, with the exception that the rubbing of the master batch chips was not performed during the manufacturing of the master batch containing particles in (2).

Consequently, the delivery of the chips to the drying process was not efficient due to lumping resulting from surface fusion of the chips during the crystallization of the master batch chips, and in the drying process, the lumped chips were dried and thus had high moisture content, making it difficult to control the thickness of the film and decreasing the uniformity of the properties. The properties of the obtained films are shown in Table 3 below.

REFERENCE EXAMPLES 5 AND 6

Heat-shrinkable films were manufactured in the same manner as in Examples 1 and 2, with the exception that the mixing method of 2,2-dimethyl(-1,3-propane)diol copolyester and master batch chips in (3) was changed in such a manner that 80 wt % of the crystallized 2,2-dimethyl(-1,3-propane)diol copolyester and 20 wt % of the crystallized master batch chips containing 50 wt % of particles were mixed using a stirrer and dried in a drier at 160° C., after which the dried mixture chips were delivered to the hopper at the top of the extruder using a blower and then fed into the extruder. As such, the temperature of the extruder and the film forming conditions were the same as in the above examples. The properties of the obtained films are shown in Table 3 below.

In Reference Example 6, the (2) master batch chips containing particles of Example 1 were not subjected to anti-sticking treatment to form minute roughness on at least a portion of the surface of the chips using rubbing between the chips and rubbing between the chips and a screw and a barrel by means of a milling machine equipped with a screw.

REFERENCE EXAMPLES 7 AND 8

Heat-shrinkable films were manufactured in the same manner as in Example 1, with the exception that the amount of the particles in the film and the TD stretching conditions were changed as shown in Table 2 below.

The properties of the obtained films are shown in Table 3 below.

TABLE 1

|  |  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| CO-PET | Ethyleneglycol (mol %) | 100 | 106 | 96 | 100 | 100 | 100 | 106 | 102 | 100 | 100 |
|  | 2,2-Dimethyl(-1,3-propane)diol (mol %) | 24 | 18 | 28 | 24 | 24 | 24 | 18 | 22 | 24 | 24 |
|  | IV (dl/g) | 0.67 | 0.69 | 0.62 | 0.67 | 0.67 | 0.67 | 0.69 | 0.68 | 0.67 | 0.67 |
|  | Glass Transition Temp (° C.) | 76 | 79 | 70 | 76 | 76 | 76 | 79 | 73 | 76 | 76 |
| Master Batch having Particles | Average Particle Size (μm) | 0.5 | 0.5 | 2.5 | 0.5 | 0.5 | 4.5 | 0.5 | 0.5 | 0.5 | 6.0 |
|  | Amount of Particles (wt %) | 50 | 50 | 20 | 60 | 50 | 50 | 10 | 50 | 50 | 60 |
|  | Amount of Mixed Master Batch having Particles (wt %) | 20 | 20 | 15 | 5 | 7 | 4 | 20 | 7 | 25 | 5 |
|  | Anti-Sticking Treatment | ○ | ○ | ○ | ○ | ○ | ○ | ○ | ○ | ○ | ○ |
|  | Mixing Method of Master Batch Chips and COPET | Using Separator | Using Separator | Using Separator | Using Separator | Using Separator | Using Separator | Using Separator | Using Separator | Using Separator | Using Separator |
|  | Amount of Particles per Total Weight of Film (wt %) | 10 | 10 | 3 | 3 | 3.5 | 2 | 2 | 3.5 | 12.5 | 3 |
| MD Stretch | Stretching Ratio (%; Additional Stretch other than natural stretch) | 1.003 | 1.003 | 1.050 | 1.003 | 1.003 | 1.003 | 1.050 | 1.003 | 1.003 | 1.003 |

TABLE 1-continued

|  |  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| TD Stretch | Preheat Temp (° C.) | 85 | 88 | 85 | 88 | 88 | 92 | 88 | 88 | 85 | 88 |
|  | Stretch Temp (° C.) | 70 | 72 | 73 | 82 | 72 | 94 | 82 | 70 | 70 | 82 |
|  | Stretch Ratio (Times) | 4.2 | 3.8 | 4.2 | 4.1 | 4.2 | 4.1 | 4.5 | 4.2 | 4.2 | 4.1 |
|  | Heat Treatment Temp (° C.) | Room Temp | 97 | Room Temp | 83 | Room Temp | 94 | Room Temp | Room Temp | Room Temp | 83 |

TABLE 2

|  |  | Ref. Ex. 1 | Ref. Ex. 2 | Ref. Ex. 3 | Ref. Ex. 4 | Ref. Ex. 5 | Ref. Ex. 6 | Ref. Ex. 7 | Ref. Ex. 8 |
|---|---|---|---|---|---|---|---|---|---|
| CO-PET | Ethyleneglycol (mol %) | 100 | 106 | 96 | 100 | 100 | 106 | 106 | 96 |
|  | 2,2-Dimethyl(-1,3-propane)diol (mol %) | 24 | 18 | 28 | 24 | 24 | 18 | 18 | 28 |
|  | IV (dl/g) | 0.67 | 0.69 | 0.62 | 0.67 | 0.67 | 0.69 | 0.69 | 0.62 |
|  | Glass Transition Temp (° C.) | 76 | 79 | 70 | 76 | 76 | 79 | 79 | 70 |
| Master Batch having Particles | Average Particle Size (μm) | 0.5 | 0.5 | 2.5 | 0.5 | 0.5 | 0.5 | 0.5 | 0.5 |
|  | Amount of Particles (wt %) | 50 | 50 | 20 | 60 | 50 | 50 | 50 | 20 |
|  | Mixed Amount with CO-PET (wt %) | 20 | 20 | 15 | 5 | 20 | 20 | 2 | 15 |
| Anti-Sticking Treatment |  | x | x | x | x | ○ | x | ○ | ○ |
| Mixing Method of Master Batch Chips and COPET |  | Using Separator | Using Separator | Using Separator | Using Separator | Combining Drier | Combining Drier | Using Separator | Using Separator |
| Amount of Particles per Total Weight of Film (wt %) |  | 10 | 10 | 3 | 3 | 10 | 10 | 1 | 3 |
| MD Stretch | Stretching Ratio (%; Additional Stretch other than natural stretch) | 1.003 | 1.003 | 1.050 | 1.003 | 1.003 | 1.003 | 1.003 | 1.050 |
| TD Stretch | Preheat Temp (° C.) | 85 | 88 | 85 | 88 | 85 | 88 | 88 | 85 |
|  | Stretch Temp (° C.) | 70 | 72 | 73 | 82 | 70 | 72 | 72 | 702 |
|  | Stretch Ratio (Times) | 4.2 | 3.8 | 4.2 | 4.1 | 4.2 | 3.8 | 3.8 | 4.3 |
|  | Heat Treatment Temp (° C.) | Room Temp | 97 | Room Temp | 83 | Room Temp | 97 | 97 | Room Temp |

Note)
"Using Separator": A kind of polymer mixing method: Upon feeding 2,2-dimethyl(-1,3-propane)diol copolyester and a master batch into an extruder, to prevent miscibility of chips from decreasing due to a difference in specific gravity, a separator was provided in a hopper, so that the 2,2-dimethyl(-1,3-propane)diol copolyester was fed into one portion of the hopper divided by the separator and the master batch chips containing particles were fed into the other portion of the hopper using a side feeder able to feed chips at a predetermined rotational frequency, whereby the 2,2-dimethyl(-1,3-propane)diol copolyester and the master batch chips containing particles were mixed and extruded by means of the screw of the extruder via the rotation of the extruder.

Note)
"Combining Drier": A kind of polymer mixing method: The crystallized 2,2-dimethyl(-1,3-propane)diol copolyester and the crystallized (or non-crystallized) master batch chips containing particles were mixed using a stirrer and dried in a drier, after which the dried mixture chips were delivered to a hopper at a top of the extruder using a blower and then fed into the extruder.

TABLE 3

|  | Heat Shrinkage (%) | Heat Shrinkage Deviation (%) | Haze (%) | Haze Deviation (%) | Printing Defect (%) | Peeling Defect (%) |
|---|---|---|---|---|---|---|
| Ex. 1 | 77.2 | 2.0 | 91.63 | 1.21 | 0 | 0 |
| Ex. 2 | 41.3 | 2.5 | 91.58 | 1.73 | 0 | 0.1 |
| Ex. 3 | 72.0 | 2.0 | 91.09 | 1.65 | 0 | 0 |
| Ex. 4 | 63.3 | 3.2 | 90.83 | 2.18 | 0 | 0 |
| Ex. 5 | 75.1 | 2.2 | 91.03 | 1.53 | 0 | 0 |
| Ex. 6 | 40.6 | 2.3 | 88.92 | 2.97 | 0 | 0.2 |
| Ex. 7 | 68.7 | 3.3 | 84.32 | 3.85 | 0 | 0 |
| Ex. 8 | 76.1 | 1.9 | 91.13 | 1.45 | 0 | 0 |
| Ex. 9 | 70.8 | 2.2 | 91.78 | 1.25 | 5.6 | 0 |
| Ex. 10 | 61.5 | 3.5 | 91.21 | 1.81 | 17.8 | 0 |
| Ref. Ex. 1 | 74.2 | 6.3 | 89.51 | 10.54 | 32.3 | 5.4 |
| Ref. Ex. 2 | 39.4 | 8.7 | 87.59 | 9.89 | 44.7 | 53.4 |
| Ref. Ex. 3 | 69.2 | 7.9 | 86.48 | 8.79 | 39.1 | 10.4 |
| Ref. Ex. 4 | 59.3 | 8.5 | 86.13 | 7.95 | 40.3 | 21.3 |
| Ref. Ex. 5 | 76.1 | 8.7 | 82.32 | 13.57 | 35.1 | 0 |
| Ref. Ex. 6 | 39.4 | 6.5 | 80.13 | 15.92 | 37.2 | 54.7 |
| Ref. Ex. 7 | 40.7 | 2.4 | 62.71 | 1.53 | 0 | 0.2 |
| Ref. Ex. 8 | 39.8 | 6.7 | 87.53 | 7.52 | 0 | 17.2 |

As is apparent from Table 3, in Reference Examples 1 to 4 using master batch chips obtained using crystallization and a drying processes without performing anti-sticking treatment, the lumping of the chips was mainly the result of surface fusion that took place upon crystallization, and thereby, the productivity of the drying process was decreased to 50% or less compared to the examples, thus making it difficult to produce a film. Because of the lumping of the master batch chips, feeding uniformity of the chips into the extruder was decreased and a severe amount of hydrolysis took place upon discharging the polymer attributed to partial non-uniform drying of the lumped chips, undesirably lowering the viscosity and decreasing the discharge pressure of a die, resulting in a film that had a non-uniform thickness. Thereby, the deviations in shrinkage and haze became large, and when the label was printed, printing was very poor due to non-uniform thickness. Furthermore when the label was removed, peeling was also non-uniform due to non-uniform shrinkage, remarkably deteriorating the peeling processability.

In Reference Examples 5 and 6 in which a separator was not provided in the extruder to uniformly mix the master batch chips containing particles and the 2,2-dimethyl(-1,3-propane)diol copolyester and two kinds of chips were uniformly mixed and dried in the drying process and then transported to the hopper at the top of the extruder to form a film, the two kinds of chips uniformly mixed in the drier were separated from each other upon delivery from the drier to the hopper due to the difference in specific gravity between the master batch chips containing particles and the 2,2-dimethyl(-1,3-propane)diol copolyester, and simultaneously, when the chips were fed into the extruder from the hopper, mixing uniformity was decreased, thus lowering uniform dispersibility of particles in the film, undesirably resulting in large deviations in shrinkage and haze of the formed film. Also protrusions were generated due to uplift of the particles during the stretching process at portions at which the amount of particles was excessively high, making it difficult to uniformly apply ink upon printing to thereby result in a poor appearance and poor printing. The shrinkage was greatly decreased at portions at which the amount of particles was excessively high, undesirably resulting in high peeling defects upon evaluation of the peeling.

In Example 9 in which the amount of the particles in the film exceeded the appropriate level, there was almost no increase in haze despite the use of a large amount of particles, and shrinking of the polymer chains was decreased, thus slightly reducing the shrinkage compared to the film having an appropriate amount of particles, and also protrusions were generated due to aggregation of the particles, undesirably deteriorating the print appearance.

In Reference Example 7 in which the amount of the particles in the film was not more than the appropriate level, it was difficult to obtain a desired hiding capacity, and printing was not problematic but a white back-coating had to be applied on the surface opposite the printed surface, undesirably decreasing processability and increasing manufacturing costs.

In Reference Example 8 in which the stretching temperature was too high, it was difficult to perform uniform stretching over the entire width thus obtaining a non-uniform thickness, consequently remarkably increasing the shrinkage deviation. The peeling process resulted in a high peeling defect because of low shrinkage, undesirably drastically lowering the processability.

In Example 10 using the master batch chips containing particles whose size was not less than the appropriate level, protrusions were greatly generated due to uplift of the particles during the stretching because of the excessively large particles, thus deteriorating the printing process resulting in very low productivity.

Therefore, the heat-shrinkable polyester-based single-layer film according to the present invention includes a polyester-based resin matrix including a repeating unit of 2,2-dimethyl(-1,3-propane)diol copolyester and particles dispersed in the resin matrix, wherein the film has a haze of 80~95%, a haze deviation of within ±5% of the average over the entire width of a film roll, a shrinkage of 40~80% in a maximum shrinking direction upon treatment with warm water at 90 for 10 sec, and a shrinkage deviation of within ±5% of the average in the maximum shrinking direction, thus exhibiting superior processability, print appearance and peeling characteristics.

The invention claimed is:

1. A heat-shrinkable polyester-based single-layer film, comprising a polyester-based resin matrix including a repeating unit of 2,2-dimethyl(-1,3-propylene)terephthalate and particles dispersed in the resin matrix, wherein the film has a haze of 80 95%, a haze deviation of within ±5% of an average haze over an entire width of a film roll, a shrinkage of 40 80% in a maximum shrinking direction upon treatment with warm water at 90° C. for 10 sec, and a shrinkage deviation of within ±5% of an average shrinkage in the maximum shrinking direction, wherein the heat-shrinkable polyester-based single-layer film is manufactured by a method of extruding and stretching a polyester-based resin, comprising: compounding particles having an average particle size of 0.1-5 μm and a 2,2-dimethyl(-1,3-propane)diol copolyester resin having an intrinsic viscosity of at least 0.6 dl/g to give a polyester-based resin master batch containing the particles, wherein the particles are included in an amount of 10-70 wt % based on a total weight of the master batch; mixing and extruding the polyester-based resin master batch containing the particles and additional 2,2-dimethyl(-1,3-propane)diol copolyester resin to produce an unstretched polyester-based sheet, wherein the particles are included in an amount of 2-10 wt % based on a total weight of the sheet; preheating the extruded polyester-based sheet; and stretching the sheet in a transverse direction at 65-100° C., and wherein the manufacturing the master batch comprises: providing a mixture of the 2,2-dimethyl(-1,3-propane)diol copolyester and the particles; placing the mixture in a twin-screw extruder or a kneader so that the mixture is melted and mixed to give polyester-based master batch chips containing the particles; rubbing the master batch chips with each other to form minute roughness on at least a portion of a surface thereof; and drying the master batch chips having minute roughness on at least the portion of the surface thereof.

2. The heat-shrinkable polyester-based single-layer film of claim 1, wherein the particles have an average particle size of 0.1-5 μm.

3. The heat-shrinkable polyester-based single-layer film of claim 1, wherein the particles are titanium oxide, and are included in an amount of 2-10 wt % based on a total weight of the film.

4. A method of manufacturing a heat-shrinkable polyester-based single-layer film by extruding and stretching a polyester-based resin, comprising:

compounding particles having an average particle size of 0.1-5 μm and a 2,2-dimethyl(-1,3-propane)diol copolyester resin having an intrinsic viscosity of at least 0.6 dl/g, thus manufacturing a polyester-based resin master batch containing particles, wherein the particles are included in an amount of 10-70 wt % based on a total weight of the master batch;

mixing and extruding the polyester-based resin master batch containing particles and a 2,2-dimethyl(-1,3-propane)diol copolyester resin, thus manufacturing an unstretched polyester-based sheet, wherein the particles are included in an amount of 2-10 wt % based on a total weight of the film;

preheating the extruded polyester-based sheet; and stretching the sheet in a transverse direction at 65-100° C.;

wherein the manufacturing the master batch comprises mixing the 2,2-dimethyl(-1,3-propane)diol copolyester and the particles to create a mixture; placing the mixture in a twin-screw extruder or a kneader so that the mixture is melted and mixed, thus obtaining polyester-based master batch chips containing particles; rubbing the master batch chips with each other to form minute roughness on at least a portion of a surface thereof; and drying the master batch chips having minute roughness on at least the portion of the surface thereof.

5. The method of claim 4, wherein the mixing the master batch and the 2,2-dimethyl(-1,3-propane)diol copolyester resin comprises providing a separation means in a feeding section for feeding the master batch and the resin into an extruder, so that the 2,2-dimethyl(-1,3-propane)diol copolyester resin is fed into one portion of the feeding section divided by the separation means, and the master batch chips are fed into the other portion of the feeding section using a quantitative feeding section, thus melting and mixing the master batch and the 2,2-dimethyl(-1,3-propane)diol copolyester resin at a feeding section of the extruder via rotation of a screw of the extruder.

6. The method of claim 4, wherein the stretching in the transverse direction is performed at a stretching ratio of 3.5-5.0 times.

7. The method of claim 4, wherein the particles of the polyester-based resin master batch are titanium oxide.

* * * * *